(12) United States Patent
Nobuoka et al.

(10) Patent No.: US 11,386,573 B2
(45) Date of Patent: Jul. 12, 2022

(54) ARTICLE RECOGNITION APPARATUS

(71) Applicant: TOSHIBA TEC KABUSHIKI KAISHA, Tokyo (JP)

(72) Inventors: Tetsuya Nobuoka, Mishima Shizuoka (JP); Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 17/024,222

(22) Filed: Sep. 17, 2020

(65) Prior Publication Data
US 2021/0090287 A1 Mar. 25, 2021

(30) Foreign Application Priority Data
Sep. 25, 2019 (JP) .............................. JP2019-174065

(51) Int. Cl.
*G06T 7/73* (2017.01)
*G06V 10/25* (2022.01)
*G06V 10/26* (2022.01)
*G06V 10/98* (2022.01)

(52) U.S. Cl.
CPC ................ *G06T 7/73* (2017.01); *G06V 10/25* (2022.01); *G06V 10/26* (2022.01); *G06V 10/98* (2022.01)

(58) Field of Classification Search
CPC ....... G06T 7/0002; G06T 7/0004; G06T 7/50; G06T 7/521; G06T 7/70; G06T 7/73; G06T 2207/30108; G06K 9/00; G06V 10/255; G06V 20/64; G06V 20/647; G06V 20/653; G06V 30/1473
See application file for complete search history.

(56) References Cited

U.S. PATENT DOCUMENTS

2018/0150699 A1 5/2018 Yasunaga
2020/0300618 A1* 9/2020 Freed et al. ........... G01B 15/00

* cited by examiner

*Primary Examiner* — Andrew W Johns
(74) *Attorney, Agent, or Firm* — Kim & Stewart LLP

(57) ABSTRACT

In accordance with an embodiment, an article recognition apparatus includes a first interface, a second interface, and a processor. The processor determines an article region from an image obtained by the first interface and determines a tilt of the article present in the determined article region on the basis of a distance obtained by the second interface. Further, the processor determines on the basis of the determined tilt of the article that the article is placed in the placement region in a state in which the article leans against another object.

10 Claims, 9 Drawing Sheets

ARTICLE RECOGNITION APPARATUS

CROSS-REFERENCE TO RELATED APPLICATION

This application is based upon and claims the benefit of priority from the prior Japanese Patent Application No. 2019-174065, filed on Sep. 25, 2019, the entire contents of which are incorporated herein by reference.

FIELD

An embodiment described here generally relates to an article recognition apparatus.

BACKGROUND

An article recognition apparatus that recognizes a plurality of articles (objects) from a captured image has been implemented. The article recognition apparatus performs processing of determining an image region of an article from a captured image obtained by imaging an imaging area including a region in which the article is placed and determining the article in the determined image region of the article.

However, in a case where a plurality of articles is set as recognition targets, some of the articles may be placed leaning against the other articles and the like. An image obtained by imaging an article placed leaning against another article is different from an original image obtained by imaging the article when the article is registered in a dictionary. There is thus a problem that a traditional article recognition apparatus may erroneously recognize the article placed leaning against the other article.

DETAILED DESCRIPTION

In accordance with one embodiment, an article recognition apparatus includes a first interface, a second interface, and a processor. The first interface obtains an image obtained by imaging a placement region of an article. The second interface obtains information regarding a distance from a predetermined position to the article present in the placement region of the article. The processor determines an article region from the image obtained by the first interface. The processor determines a tilt of the article present in the determined article region on the basis of the distance obtained by the second interface. The processor determines (detects) on the basis of the determined tilt of the article that the article is placed in the placement region in a state in which the article leans against another object.

Figure 1:
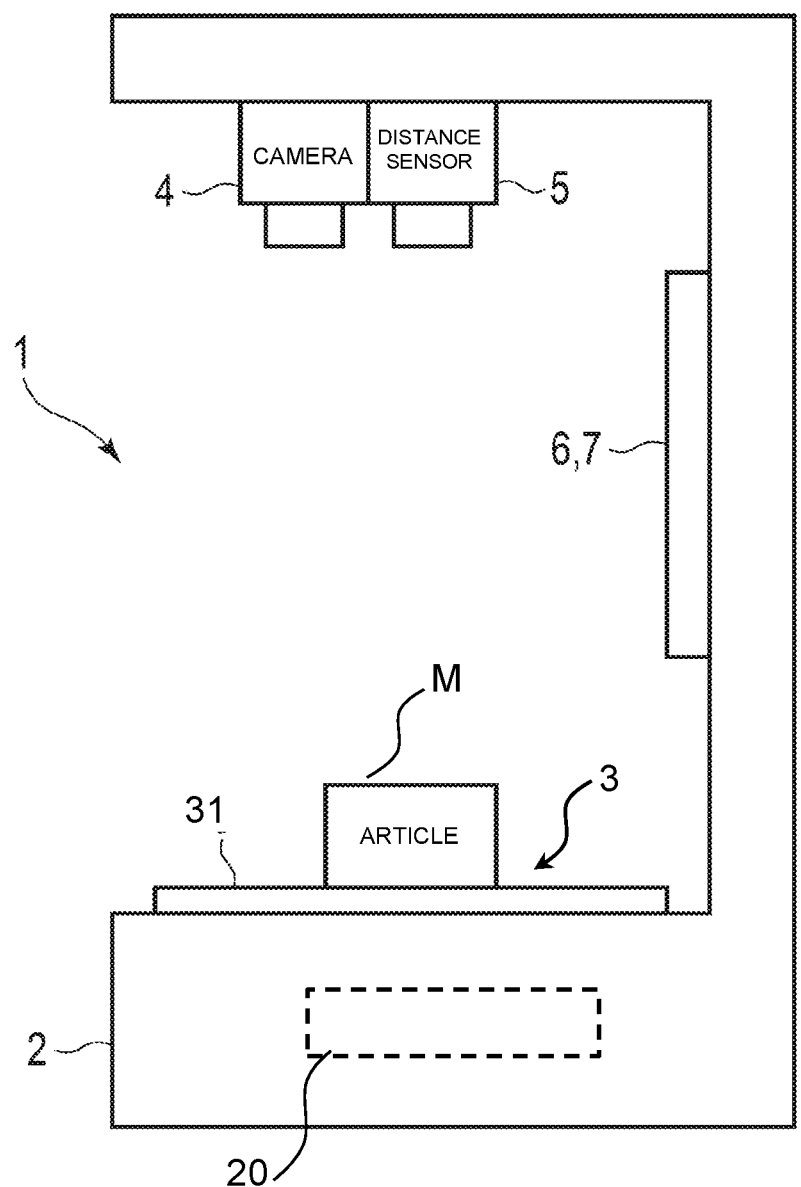
FIG. 1 is a diagram schematically showing a configuration example of an article recognition apparatus according to an embodiment.

Hereinafter, the embodiment will be described with reference to the drawings. The same reference signs in the drawings will denote the same or similar portions. FIG. 1 schematically shows a configuration example of an article recognition apparatus 1 according to the embodiment. The article recognition apparatus 1 detects an article (commodity) from a captured image and recognizes (determines) the detected article. For example, it is assumed that the article recognition apparatus 1 is used in a payment system and operated to recognize a commodity to be paid for. A payment system that connects a payment apparatus to the article recognition apparatus 1, recognizes a commodity placed on a placement table 3 by a user, and performs payment for the recognized commodity is assumed as an example of the payment system.

In a case where the article recognition apparatus 1 is used in the payment system, the article recognition apparatus 1 is installed at a store or the like that sells commodities. In this case, the article recognition apparatus 1 may be installed as a self-register that the user operates by himself or herself. Further, the article recognition apparatus 1 may be connected to a payment apparatus that an employee of the store operates and be used as a part of the payment system.

It should be noted that the article recognition apparatus 1 according to the embodiment shown below is not limited to the one that detects and recognizes a commodity to be paid for, and only needs to detect and recognize an article present in a captured image. For example, the article recognition apparatus 1 may be used in a system that detects articles present in a captured image for counting the articles.

As shown in FIG. 1, the article recognition apparatus 1 includes a casing 2, the placement table 3, a camera 4, a distance sensor 5, a display 6, and an operation panel 7. The article recognition apparatus 1 recognizes all articles M placed on the placement table 3. For example, the articles M to be recognition targets may be placed directly on the placement table 3 or the articles M in a container such as a basket may be placed on the placement table 3. Hereinafter, in this embodiment, the description will be given assuming article recognition processing in a case where a plurality of articles is placed on the placement table 3.

The casing 2 forms an outer shape of the article recognition apparatus 1. The casing 2 is not limited to a particular shape and only needs to have a shape such that various components can be installed in the casing 2. As shown in FIG. 1, the casing 2 has a shape such that the camera 4 and the distance sensor 5 are set above the placement table 3. Further, the casing 2 stores a calculator (computer) including a processing device 20 (see FIG. 2) including a processor, a storage unit, various interfaces, and the like.

The camera 4 images an imaging area including the placement table 3. Further, the distance sensor 5 measures a distance between a placement surface 31 of the placement table 3 for the articles M and the articles M placed on the placement table 3 and outputs information (depth information) regarding the measured distance. The article recognition apparatus 1 detects and recognizes each of the articles present in the image captured by the camera 4 by using the information regarding the distance that is output by the distance sensor 5. The article recognition apparatus 1 detects images of all the articles from the image captured by the camera 4. The article recognition apparatus 1 recognizes the article on the basis of the detected image of each article.

The placement table 3 includes the surface (article placement surface) 31 on which the articles M set as the recognition targets are placed. The article placement surface 31 of the placement table 3 is an area (article arrangement area) on which all the articles to be the recognition targets are arranged. Hereinafter, the article placement surface 31 will be also referred to as an article arrangement area 31. For example, the article placement surface 31 of the placement table 3 may be painted in a predetermined pattern (e.g., black). Further, a basket in which the plurality of articles set as the recognition targets is put may be placed on the placement table 3. The placement table 3 is set such that the article arrangement area 31 falls within the imaging area of the camera 4. Further, the placement table 3 may be a part of a conveying apparatus such as a belt conveyor that conveys a plurality of articles as recognition targets placed thereon.

The camera 4 captures an image by using an area including the article arrangement area 31 of the placement table 3 as the imaging area. As shown in FIG. 1, the camera 4 images the imaging area including the article arrangement area (article placement surface) 31 of the placement table 3 from above the placement table 3. The camera 4 only needs to be capable of capturing an image of the articles M on the placement table 3 or the articles in the basket on the placement table 3 as an image from which article information (article determination information) to be used for the article recognition processing can be extracted. For example, the camera 4 includes a charge-coupled device (CCD) camera and the like. Further, the camera 4 may image invisible light. The camera 4 may be a plurality of cameras. The camera 4 is not limited to a particular configuration.

The distance sensor 5 uses the article arrangement area (article placement surface) 31 of the placement table 3 as a measurement area and measures a distance to each of the articles (objects) M in the measurement area. The distance sensor 5 measures a distance to the article M in the measurement area from a predetermined position above the placement table 3. The distance sensor 5 is a 3D camera, for example. The 3D camera captures a distance image by using the article arrangement area 31 as the measurement area. The distance image is captured as information regarding a depth from the predetermined position (depth information). In FIG. 1, the 3D camera obtains the distance image as the depth information by imaging the placement table 3 from above. Accordingly, the 3D camera serving as the distance sensor 5 shown in FIG. 1 obtains the depth information about an imaged surface of the articles M placed on the placement table 3.

For example, the 3D camera serving as the distance sensor 5 is implemented as the one that obtains depth information by using the time-of-flight (ToF) technique. The 3D camera based on the ToF technique measures a distance to an imaged object on the basis of a travel time (delay time) of light and a light velocity until the light emitted from a light source is reflected on the object and reaches the sensor. The 3D camera is not limited to the ToF technique. Alternatively, a twin-lens reflex camera or a plurality of cameras may be used for the 3D camera for obtaining depth information on the basis of the parallax. Still alternatively, the 3D camera may project a dotted pattern and obtain depth information on the basis of distortion of the dotted pattern.

The display (display unit) 6 is a display apparatus that displays various types of information. The display 6 is an informing apparatus that emits an alert. The display 6 includes a display panel and a driving circuit that causes the display panel to display a screen. The display panel is a display device such as a liquid-crystal display and an organic electro-luminescence (EL) display, for example.

The operation panel (operation unit) 7 is a user interface for an operator to input various operation instructions. The operation panel 7 transmits data regarding the operation instructions input by the operator to the processing device 20. The operation panel 7 is a keyboard, a ten key, a touch panel, or the like, for example. Additionally or alternatively, the operation panel 7 may receive gesture inputs from a user. Alternatively, the display 6 and the operation panel 7 may be a display device equipped with a touch panel. The operation panel 7 is a touch panel, for example, and is formed integrally with the display 6.

It should be noted that the display 6 may be installed at an arbitrary position as long as the user can visually recognize the display 6. Further, the operation panel 7 may be installed at an arbitrary position as long as the user can operate the display 6. For example, the display device equipped with the touch panel including the display 6 and the operation panel 7 may be formed integrally with the casing 2. Further, the article recognition apparatus 1 does not need to include either the display 6 or the operation panel 7 or both the display 6 and the operation panel 7. Further, the article recognition apparatus 1 may include a lighting device that emits light to the article arrangement area 31 of the placement table 3. Further, the article recognition apparatus 1 may include a sensor that detects that a commodity (or basket) is placed on the placement table 3. The article recognition apparatus 1 may start the article recognition processing when the article recognition apparatus 1 detects that a commodity (or basket) is placed the placement table 3.

Figure 2:
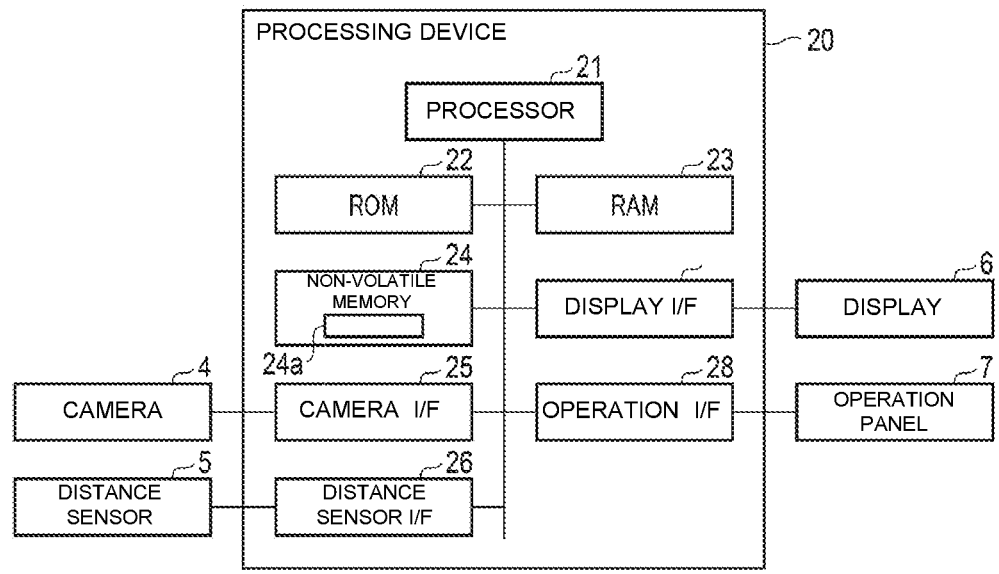
FIG. 2 is a block diagram showing an example of a control system for the article recognition apparatus according to the embodiment.

Next, a configuration of a control system for the article recognition apparatus 1 will be described. FIG. 2 shows a configuration example of the control system of the article recognition apparatus 1. As shown in FIG. 2, the camera 4, the distance sensor 5, the display 6, and the operation panel 7 are connected to the processing device 20. The processing device 20 includes a processor 21, a ROM 22, a RAM 23, a non-volatile memory 24, an article dictionary (article information database) 24a, a camera interface (I/F) 25, a distance sensor I/F 26, a display I/F 27, and an operation I/F 28.

The processor 21 serves to comprehensively control the article recognition apparatus 1. The processor 21 is a CPU, for example. The processor 21 achieves various types of processing on the basis of a program and control data stored in the ROM 22 or the non-volatile memory 24. For example, the processor 21 executes the program stored in the ROM 22 to thereby perform various types of processing such as operation control and payment processing of the article recognition apparatus 1. It should be noted that some of the various functions to be achieved by the processor 21 to be described later may be achieved by hardware.

The ROM 22 is a non-volatile memory that pre-stores a control program, control data, and the like. The ROM 22 is incorporated in the article recognition apparatus 1 after the control program, the control data, and the like are stored in the ROM 22 in the manufacture phase. That is, the control program and the control data stored in the ROM 22 are incorporated in advance in a manner that depends on the specifications of the article recognition apparatus 1.

The RAM 23 is a volatile memory. The RAM 23 functions as a working memory. The RAM 23 temporarily stores data being processed by the processor 21, for example. The RAM 23 stores an application program on the basis of a command from the processor 21. The RAM 23 may further store data necessary for execution of the application program, a result of execution of the application program, and the like.

The non-volatile memory 24 includes a data writable and rewritable non-volatile memory. For example, the non-volatile memory 24 includes a hard disk drive (HDD), a solid-state drive (SSD), EEPROM (registered trademark), a flash ROM, and the like. The non-volatile memory 24 stores control programs, applications, and various types of data depending on the operation purpose of the article recognition apparatus 1.

The non-volatile memory 24 includes an article dictionary 24a. The article dictionary 24a stores information (article information) regarding articles (registered articles) to be subjected to the article recognition processing. It should be noted that the article dictionary 24a may be provided in an external apparatus capable of communication via a communication interface. The article dictionary 24a stores the article information to be used in the article recognition processing, associated with information including an article code, an article name, an article category, a price, and the like for each registered article.

The article information includes feature information for recognizing the article on the basis of the captured image, information (outer shape information) indicating the outer shape (outline) of the article, and information (height information) indicating the height of the article, and the like. The feature information is information according to an article recognition method for the image of the article included in the captured image. The outer shape information may be four-corner coordinates of the rectangular surface of the article, for example. Alternatively, the outer shape information may be information indicating the shape of the outline of the article as the article placed on the placement table 3 is viewed from above. Alternatively, the outer shape information may include information indicating an area as the article placed on the placement table 3 is viewed from above.

The camera interface (I/F) 25 is an interface that connects the camera 4 and the processing device 20 to each other. Data is input and output between the processor 21 and the camera 4 via the camera I/F 25. The camera I/F 25 is a first interface and functions as an image obtaining unit that obtains an image captured by the camera 4. For example, the processor 21 instructs the camera 4 to capture an image and obtains the image captured by the camera 4 via the camera I/F 25.

The distance sensor interface (I/F) 26 is an interface that connects the distance sensor 5 and the processing device 20 to each other. Data is input and output between the processor 21 and the distance sensor 5 via the distance sensor I/F 26. The distance sensor I/F 26 is a second interface and obtains a signal indicating the information (depth information) regarding the distance that is output by the distance sensor 5. For example, in a case where the distance sensor 5 is a 3D camera, the processor 21 instructs the 3D camera to capture a distance image and obtains the distance image captured by the 3D camera via the I/F 26.

The display interface (display I/F) 27 is an interface that connects the display 6 and the processing device 20 to each other. Data is input and output between the processor 21 and the display 6 via the display I/F 27. The display 6 displays a screen under the control of the processor 21, to which the display 6 is connected, via the display I/F 27.

The operation interface (operation I/F) 28 is an interface that connects the operation panel 7 and the processing device 20 to each other. Data is input and output between the processor 21 and the operation panel 7 via the operation I/F 28. The operation panel 7 outputs information input by an operation member such as a touch sensor, a keyboard, and a ten key via the operation I/F 28 to the processor 21.

It should be noted that the article recognition apparatus 1 may include a speaker serving as the informing apparatus that emits sound for warning or the like. In this case, the processing device 20 includes an interface for connecting to the speaker. The speaker emits sound under the control of the processor 21, to which the speaker is connected, via the interface.

Figure 3:
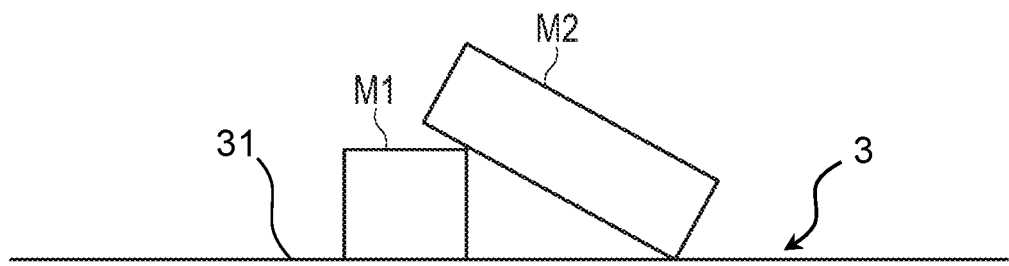
FIG. 3 is a diagram showing an arrangement example of a plurality of articles set by the article recognition apparatus according to the embodiment as recognition targets.

Next, an arrangement state in a case where a plurality of articles is arranged on the placement table 3 in the article recognition apparatus 1 will be described. FIG. 3 shows an arrangement example of the plurality of articles on the placement table 3 in the article recognition apparatus 1. Further, FIG. 4 shows an example of the captured image obtained by imaging the plurality of articles in the arrangement state shown in FIG. 3.

FIG. 3 shows a state in which two articles M (article M1 and article M2) placed on the placement table 3. As shown in FIG. 3, the article M2 leans against the article M1. Herein, a state in which the article (entire article or part of the article) is placed leaning against an object that is another article or the like is referred to as a leaning placement state. That is, it is assumed that in the example shown in FIG. 3, the article M2 is placed leaning against the article M1.

Figure 4:
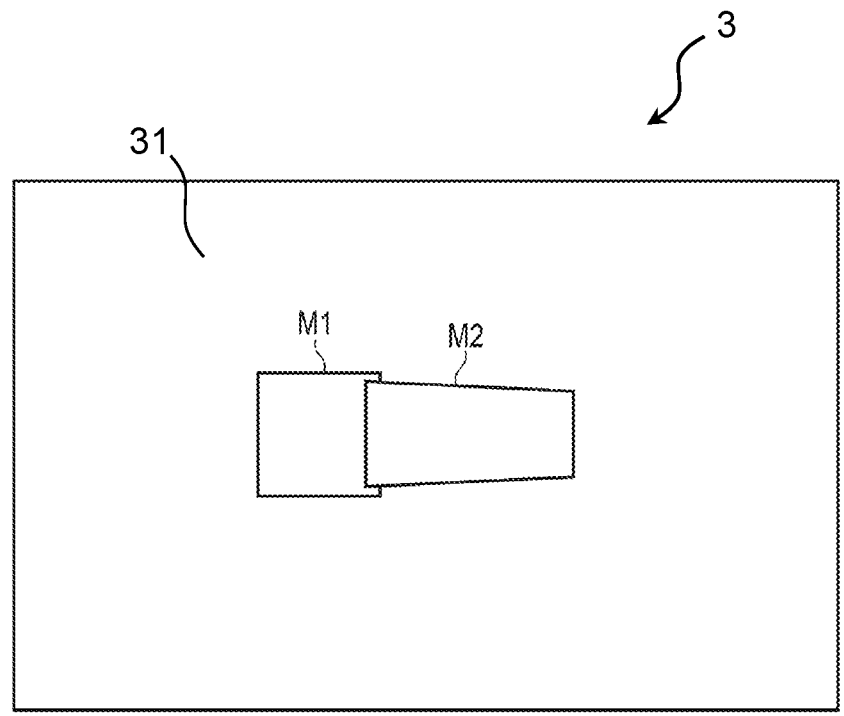
FIG. 4 is a diagram showing an example of a captured image obtained by imaging the plurality of commodities shown in FIG. 3.

When a region including the two articles M1 and M2 in the state shown in FIG. 3 is imaged from above, the captured image as shown in FIG. 4 is obtained. The captured image shown in FIG. 4 includes an image of an upper surface of the article M2 tilting due to the leaning placement. Further, the captured image shown in FIG. 4 includes an image of an upper surface of the article M1 partially hidden by the article M2. From the captured image shown in FIG. 4, it can be detected that the article M1 and the article M2 exist.

It should be noted that in the captured image shown in FIG. 4, the image of the article M2 is an image obtained by imaging the tilting upper surface. Therefore, the image of the article M2 shown in FIG. 4 is different from an original image (image captured with no tilt) obtained by imaging the upper surface of the article M2 from just above it. As a result, the feature information obtained from the image of the article M2 shown in FIG. 4 may not match the feature information (feature information registered in the article dictionary) for recognition which is registered on the basis of the original image of the upper surface of the article M2.

First Operation Example

Figure 5:
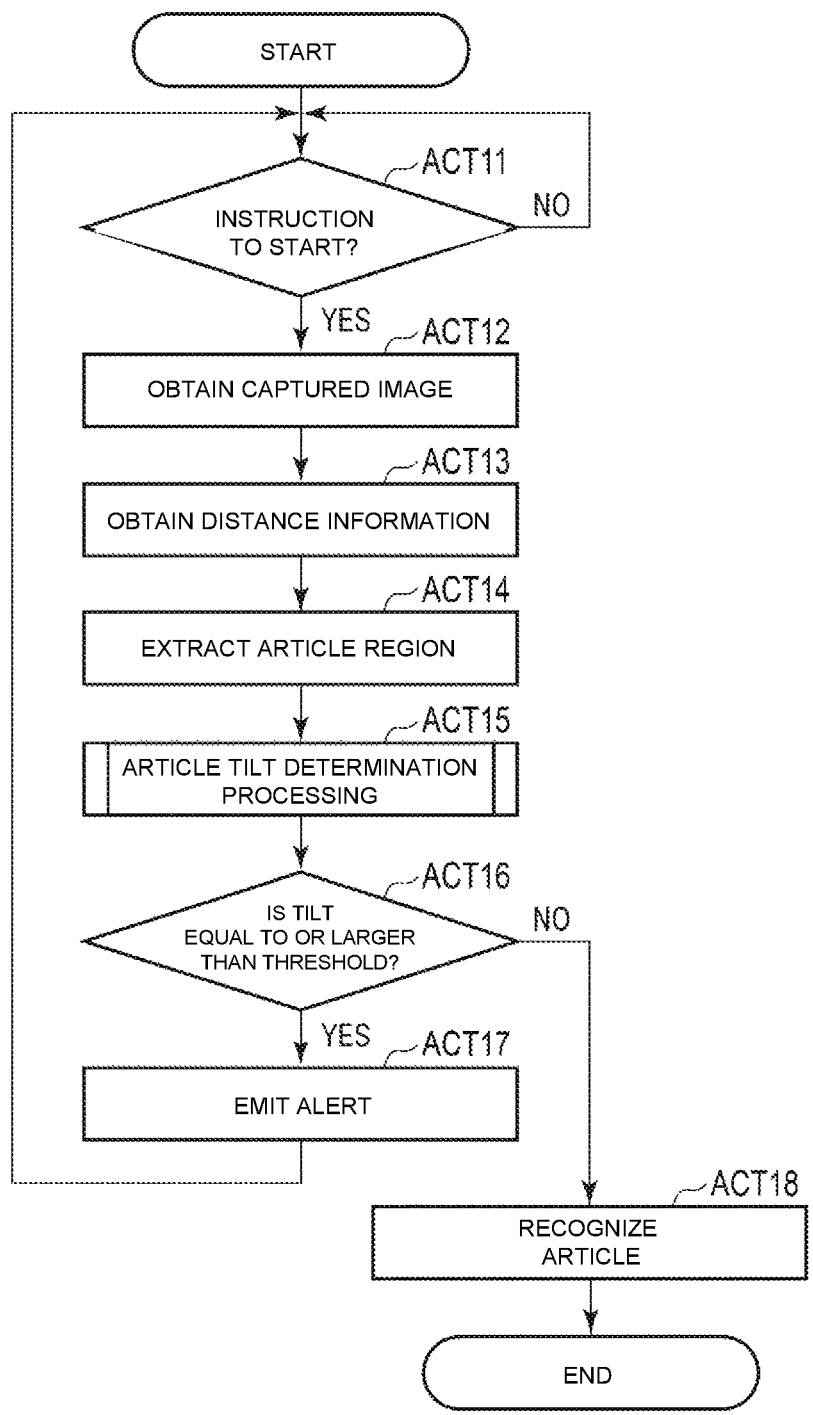
FIG. 5 is a flowchart showing a first operation example of the article recognition apparatus according to the embodiment.

Next, a first operation example of the article recognition apparatus 1 according to the embodiment will be described. FIG. 5 shows the first operation example of the article recognition apparatus 1 according to the embodiment. Under a stand-by state in ACT 11, the processor 21 receives an instruction to start the article recognition processing. For example, the processor 21 determines whether or not a start button of the operation panel 7 has received an operation. The processor 21 starts the article recognition processing in response to the reception of the operation by the start button. The start button is a button that instructs to start recognition processing for each of the articles M placed on the placement table 3. The start button may be an icon displayed by the display 6 or may be a hard key or the like provided in the operation panel 7. Further, the processor 21 may start the article recognition processing in response to detection by the sensor that the commodities (articles M) or the basket has been placed on the placement table 3. Further, the processor 21 may start the article recognition processing in response to detection of the appearance of a person or a particular move of a person.

When the processor 21 starts the article recognition processing (YES ACT 11), the processing of the processor 21 proceeds to ACT 12. In ACT 12, the processor 21 obtains an image captured by the camera 4. That is, the processor 21 instructs the camera 4 to capture an image. The camera 4 images an imaging area including the article arrangement area of the placement table 3 in accordance with the instruction from the processor 21. The processor 21 obtains the image captured by the camera 4 via the camera I/F 25. The processor 21 stores the captured image obtained from the camera 4 in the memory such as the RAM 23.

After the processor 21 starts the article recognition processing, the processor 21 obtains the image captured by the camera 4 and obtains information (depth information) regarding a distance measured by the distance sensor 5 in ACT 13. The distance sensor 5 measures a distance of a region corresponding to the imaging area of the camera 4 in accordance with the instruction from the processor 21 and outputs information regarding the measured distance. The processor 21 obtains the information regarding the distance measured by the distance sensor 5 via the distance sensor I/F 26. The processor 21 stores the information regarding the distance obtained from the distance sensor 5 in the memory such as the RAM 23.

Here, the information regarding the distance is a distance image, for example. The distance image includes information (e.g., three-dimensional coordinate values) obtained by adding distance information (depth information) to position information of each pixel in the captured image. Further, the coordinates of the imaging position of the distance image captured by the 3D camera serving as the distance sensor 5 correspond to the coordinates of the imaging position of the image captured by the camera 4. It should be noted that the processor 21 may perform processing such as positioning of the distance image and the captured image on the basis of a distance between the camera 4 and the 3D camera serving as the distance sensor 5 or viewing angles of the camera 4 and the 3D camera. Further, the information regarding the distance of each pixel in the distance image may be information indicating a height at each position of the captured image from the article placement surface 31 of the placement table 3.

When the processor 21 obtains the captured image and the information regarding the distance corresponding to the captured image, in ACT 14, the processor 21 extracts (determines) an image region (article region) of each of the articles M1 and M2 present in the captured image by using the obtained information regarding the distance. For example, the processor 21 determines a region of the placement surface 31 on the placement table 3 (or the bottom surface of the basket in which the article is put) as a background region in the captured image on the basis of the information regarding the distance. When the processor 21 determines the background region on the basis of the information regarding the distance, the processor 21 extracts (determines) an image region of each article by separating a background region from other regions in the captured image.

Alternatively, the processor 21 may divide the region at each of approximately the same distances (depths) on the basis of the information regarding the distance and determine an image region of each article on the basis of each divided region.

It should be noted that the method of extracting the image region (article region) of each article from the captured image is not limited to a particular method. For example, the method of extracting the image region of the article may be a method using a background difference. In this case, the background region in the captured image may be detected on the basis of an image pattern of the surface (article placement surface 31) of the placement table 3 on which the article is placed. Further, the method of extracting the image region of the article may be a method using deep learning.

When the processor 21 extracts the image region (article region) of each article in the captured image, in ACT 15, the processor 21 determines (estimates) a tilt of the article in the image region. For example, the processor 21 determines a normal line of a surface (article surface) of the imaged article on the basis of the information regarding the distance. Then, the processor 21 determines a tilt of the article on the basis of the determined normal line. As described above, an image of the article surface in the captured image is formed by a group of pixel (points) the positions of which are represented by the three-dimensional coordinates including the information regarding the distance. Therefore, the normal line of each of the pixels forming the article surface is determined by a general method. For example, the normal line is calculated by grouping a point cloud in the image that becomes the surface of the article or a certain number of pixels retaining the information regarding the distance and solving principal component analysis.

Figure 6:
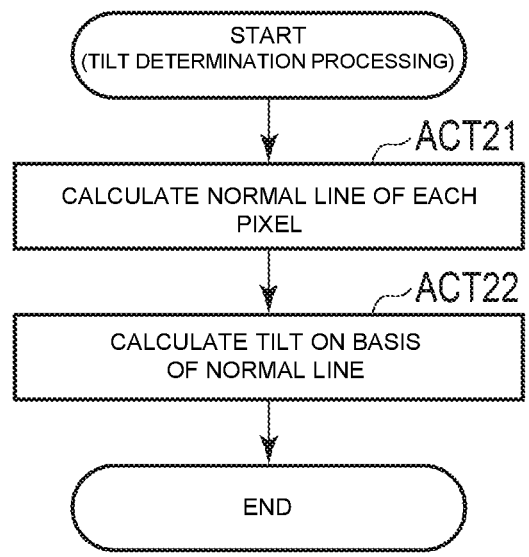
FIG. 6 is a flowchart showing article tilt determination processing of the article recognition apparatus according to the embodiment.

FIG. 6 shows a processing example in which the tilt of the article is calculated on the basis of the normal line of the article surface. In ACT 21 shown in FIG. 6, the processor 21 calculates the normal line with respect to each of the pixels forming the surface (article surface) of the imaged article. For example, the normal line of each of the pixels forming the article surface is calculated by grouping pixels that are approximately eight pixels surrounding a pixel of interest with respect to the point cloud or the pixels retaining the information regarding the distance and solving principal component analysis. It should be noted that the number of pixels grouped may be approximately four pixels surrounding the pixel of interest and it is sufficient to group at least two or more pixels for a pixel the normal line of which is to be determined. When the processor 21 calculates the normal lines with respect to the plurality of pixels forming the article surface, in ACT 22, the processor 21 calculates a tilt of the article on the basis of the calculated normal lines. For example, the processor 21 determines a direction of the article surface on the basis of a mean angle, a most frequent angle, or the like of the calculated normal lines and determines a tilt of the article with respect to a horizontal surface on the basis of the direction of the article surface.

When the processor 21 determines the tilt of the article, in ACT 16 of FIG. 5, the processor 21 determines whether or not the tilt of the article is equal to or larger than a predetermined threshold. The threshold is a value for determining whether or not the leaning placement has occurred, for which an alert should be emitted. That is, in a case where the tilt of the article is equal to or larger than the threshold, the processor 21 determines that the article is in the leaning placement state. Further, the threshold may be set in accordance with an angle at which it will be difficult to recognize the article (angle at which erroneous recognition will occur).

In a case where the processor 21 determines that the tilt of the article is equal to or larger than the threshold (YES ACT 16), the processing of the processor 21 proceeds to ACT 17. In ACT 17, the processor 21 determines that the article is in the leaning placement state and emits an alert. For example, the processor 21 displays on the display 6 the fact that the article is in the leaning placement state. Alternatively, the processor 21 may display on the display 6 a guidance for prompting to retry, saying "Please rearrange the article in the leaning placement state and carry out the article recognition again" as an alert.

Further, in a case where the processor 21 determines that the tilt of the article is not equal to or larger than the threshold (NO in ACT 16), the processing of the processor 21 proceeds to ACT 18. In ACT 18, the processor 21 recognizes each article on the basis of the region image of each article (image of the article region) extracted from the captured image. In the article recognition processing, the processor 21 determines which article of the articles registered in the article dictionary 24*a* each article present in the extracted image region (article region) of each article is.

The article recognition processing is not limited to a particular method as long as it can recognize all the articles present in the image captured by the camera 4. In the article recognition processing, each article present in the captured image is recognized by using the article information. For example, the article recognition processing may be processing of recognizing the article by using an identification pattern such as a barcode, a two-dimensional code, a character, a number, and a mark as the article information. In this case, the identification pattern such as the barcode, the two-dimensional code, the character, the number, and the mark is added to at least one surface of the article.

For example, a method of determining the article on the basis of the barcode present in the image region (article region) of the article can be applied to the processor 21. In this case, the processor 21 obtains a barcode region from the image region of the article. When the processor 21 obtains the barcode region, the processor 21 performs decoding processing on the obtained barcode region. When the processor 21 decodes the barcode (barcode region), the processor 21 matches an article code obtained by decoding the barcode to an article code of the article registered in the article dictionary 24*a*. The processor 21 determines the article on the basis of the matching article code in the matching processing of the article code.

Further, the article recognition processing may be processing of recognizing the article by using the feature information such as the feature amount extracted from the image of each article in the captured image. In this case, the feature information as the article information is a feature amount extracted from an image of the article that is obtained by imaging the article in a particular direction. The article recognition processing based on the feature amount extracted from the image of the article only needs to enable the article to be determined on the basis of the image region of the article in the captured image and is not limited to a particular method. For example, the article recognition processing may be a method of determining the article by using the feature amount of the image such as gray levels and a color histogram in the image region of the article. In this case, a feature amount according to a particular representation such as the gray levels and the color histogram in the image of the article is registered in the article dictionary 24*a* as feature information of a registered article.

As described above, in the first operation example, the article recognition apparatus 1 determines the tilt of the article in the captured image and detects whether or not the leaning placement of the article, which will lead to erroneous recognition, has occurred on the basis of the tilt of each article. In a case where the article recognition apparatus 1 detects the leaning placement of the article, the article recognition apparatus 1 prompts to retry the article recognition processing by emitting an alert. Accordingly, the article recognition apparatus 1 is capable of preventing the article from being erroneously recognized due to the leaning placement. Further, the article recognition apparatus 1 accurately recognizes the article by prompting to rearrange the article in a state that is not the leaning placement state.

It should be noted that in a case where the article recognition apparatus 1 is incorporated in the payment system, the processor 21 requests the payment apparatus to perform payment processing for each recognized article (commodity). Accordingly, the article recognition apparatus 1 is capable of emitting an alert about the article in the leaning placement state and achieving the article recognition processing for the article rearranged in a state that is not the leaning placement state. As a result, it is possible to provide a payment system capable of performing payment for articles recognized at high accuracy without erroneous recognition of the articles due to the leaning placement.

Second Operation Example

Figure 7:
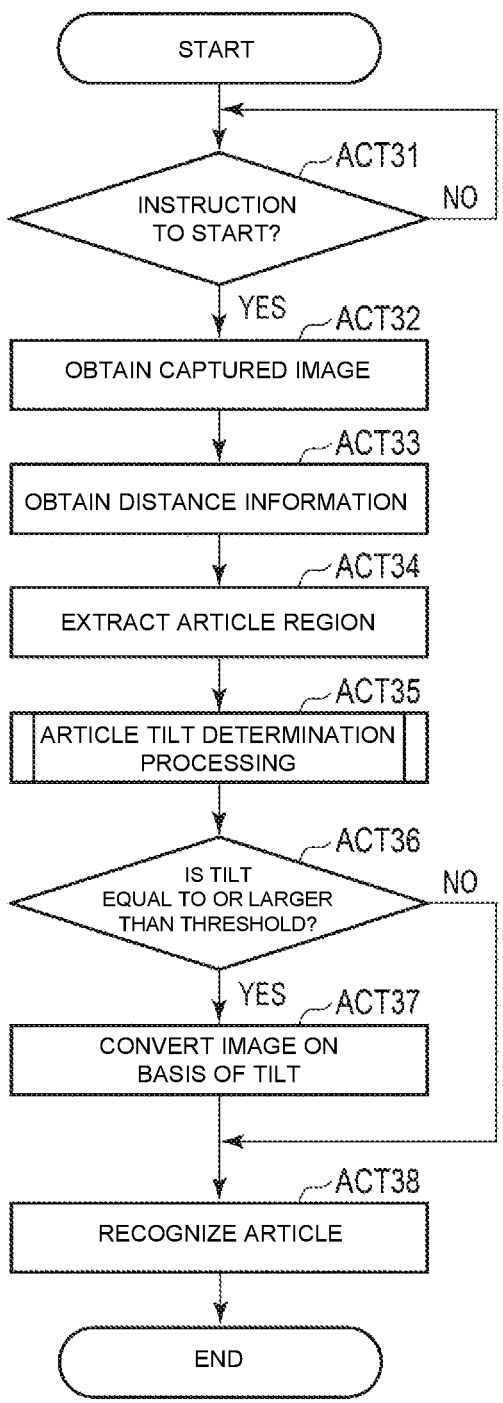
FIG. 7 is a flowchart showing a second operation example of the article recognition apparatus according to the embodiment.

Next, a second operation example of the article recognition apparatus 1 according to the embodiment will be described. FIG. 7 shows the second operation example of the article recognition apparatus 1 according to the embodiment. Under a stand-by state of ACT 31, the processor 21 of the article recognition apparatus 1 receives an instruction to start the article recognition processing. The processor 21 determines whether or not the start button of the operation panel 7 has received the operation as described above. The processor 21 starts the article recognition processing in response to the reception of the operation by the start button. When the processor 21 starts the article recognition processing (YES ACT 31), the processing of the processor 21 proceeds to ACT 32. In ACT 32, the processor 21 instructs the camera 4 to capture an image. The processor 21 obtains the image captured by the camera 4 via the camera I/F 25. The processor 21 stores the captured image obtained from the camera 4 in the memory such as the RAM 23.

In ACT 33, the processor 21 obtains information regarding a distance from the distance sensor 5. The processor 21 obtains the information regarding the distance in the imaging area of the camera 4 that is measured by the distance sensor 5 via the distance sensor I/F 26. The processor 21 stores the information regarding the distance obtained from the distance sensor 5 in the memory such as the RAM 23.

When the processor 21 obtains the captured image and the distance information corresponding to the captured image, in ACT 34, the processor 21 extracts an image region (article region) of each article present in the captured image by using the obtained information regarding the distance. The method of extracting the image region of each article from the captured image is not limited to a particular method as in the first operation example.

When the processor 21 extracts the image region of each article in the captured image, in ACT 35, the processor 21 determines (estimates) a tilt of the article in the image region. The tilt of the article in the image region in the captured image can also be determined in accordance with a method similar to the method described in the first operation example. When the processor 21 determines the tilt of the article, in ACT 36, the processor 21 determines whether or not the tilt of the article is equal to or larger than a predetermined threshold for determining the leaning placement.

In a case where the processor 21 determines that the tilt of the article is equal to or larger than the threshold (YES ACT 36), the processing of the processor 21 proceeds to ACT 37. In ACT 37, the processor 21 determines that the article is in the leaning placement state. In this case, the processor 21 corrects the image information of the article in a manner that depends on the tilt of the article. For example, the processor 21 converts the image of the article extracted from the captured image in a manner that depends on the tilt. Further, the processor 21 may correct a feature amount (e.g., coordinates of the feature point) extracted from the image region of the article in the captured image in a manner that depends on the tilt of the article.

When the processor 21 corrects the image information of the article in a manner that depends on the tilt of the article, in ACT 38, the processor 21 performs article recognition on the basis of the corrected image information and the information registered in the article dictionary 24a. It should be noted that the processor 21 may perform the article recognition processing by using image information obtained by correcting the information (e.g., coordinates of the feature point) registered in the article dictionary 24a in a manner that depends on the tilt of the article.

Further, in a case where the processor 21 determines that the tilt of the article is not equal to or larger than the threshold (NO in ACT 36), the processing of the processor 21 proceeds to ACT 38. In ACT 38, the processor 21 recognizes each article on the basis of the region image of each article extracted from the captured image. It should be noted that the article recognition processing of the article recognition apparatus 1 in ACT 38 can be achieved in accordance with the method described in the first operation example. It should be noted that the article recognition processing of the article recognition apparatus 1 in ACT 38 is not limited to a particular method.

As described above, in the second operation example, the article recognition apparatus 1 determines the tilt of the article on the basis of the captured image and detects whether or not the leaning placement of the article has occurred on the basis of the tilt of each article. In a case where the article recognition apparatus 1 detects the leaning placement of the article, the article recognition apparatus 1 corrects the image information of the article in a manner that depends on the tilt of the article and performs the article recognition processing. Accordingly, even in a case where the article is in the leaning placement state, the article can be accurately recognized owing to the correction processing depending on the tilt of the article.

It should be noted that in a case where the article recognition apparatus 1 is incorporated in the payment system, the processor 21 request the payment apparatus to perform payment processing for each recognized article (commodity).

In a case where the article recognition apparatus of the second operation example is used the payment system, the article recognition apparatus 1 corrects the image information of the article in respect to the article detected as the article in the leaning placement, in a manner that depends on the tilt. Accordingly, after the article recognition apparatus 1 corrects the image information of the article placed tilting due to the leaning placement in a manner that depends on the tilt, the article recognition apparatus 1 is capable of performing the article recognition processing. As a result, it is possible to provide a payment system capable of achieving recognition and payment for the article without making the user rearrange the article even in a case where the article to be paid for is in the leaning placement state.

Third Operation Example

Figure 8:
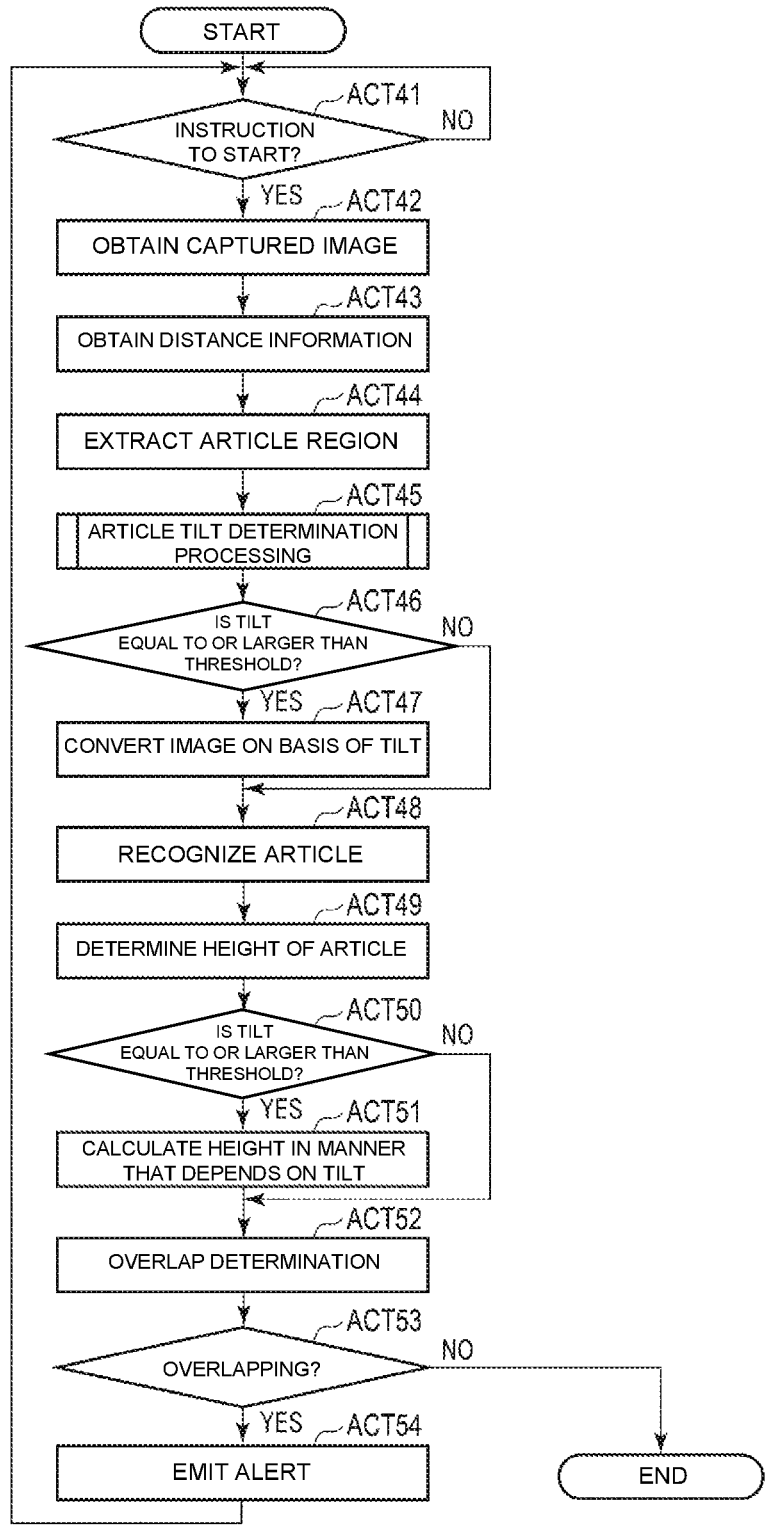
FIG. 8 is a flowchart showing a third operation example of the article recognition apparatus according to the embodiment.

Next, a third operation example of the article recognition apparatus 1 according to the embodiment will be described. FIG. 8 shows the third operation example of the article recognition apparatus 1 according to the embodiment. Under a stand-by state in ACT 41, the processor 21 of the article recognition apparatus 1 receives an instruction to start the article recognition processing. The processor 21 determines whether or not the start button of the operation panel 7 has received an operation. The processor 21 starts the article recognition processing in response to the reception of the operation by the start button. When the processor 21 starts the article recognition processing (YES ACT 41), the processing of the processor 21 proceeds to ACT 42. In ACT 42, the processor 21 obtains the image captured by the camera 4 via the camera I/F 25. In ACT 43, the processor 21 obtains information regarding a distance (distance information) in the imaging area of the camera 4 via the distance sensor I/F 26, the distance being measured by the distance sensor 5. The processor 21 stores the captured image obtained from the camera 4 and the distance information obtained from the distance sensor 5 in the memory such as the RAM 23.

When the processor 21 obtains the captured image and the distance information corresponding to the captured image, in ACT 44, the processor 21 extracts an image region of each article present in the captured image by using the obtained distance information. The method of extracting the image region of each article from the captured image is not limited to a particular method as in the first operation example.

When the processor 21 extracts the image region of each article in the captured image, in ACT 45, the processor 21 determines (estimates) a tilt of the article in the image region. The tilt of the article can also be determined in accordance with a method similar to the method described in the first operation example. When the processor 21 determines the tilt of the article, in ACT 46, the processor 21 determines whether or not the tilt of the article is equal to or larger than a predetermined threshold for determining the leaning placement.

In a case where the processor 21 determines that the tilt of the article is equal to or larger than the threshold (YES ACT 46), the processing of the processor 21 proceeds to ACT 47. In ACT 47, the processor 21 determines that the article is in the leaning placement state. In this case, the processor 21 corrects the image information of the article in a manner that depends on the tilt of the article. For example, the processor 21 converts the image region of the image of the article extracted from the captured image in a manner that depends on the tilt of the article. Further, the processor 21 may correct the feature amount extracted from the image region of the article in the captured image in a manner that depends on the tilt of the article. When the processor 21 corrects the image information of the article in a manner that depends on the tilt of the article, in ACT 48, the processor 21 performs the article recognition on the basis of the corrected image information and the information registered in the article dictionary 24a.

Further, in a case where the processor 21 determines that the tilt of the article is not equal to or larger than the threshold (NO in ACT 46), the processing of the processor 21 proceeds to ACT 48. In ACT 48, the processor 21 recognizes each article on the basis of the region image of each article extracted from the captured image. The article recognition processing can be achieved in accordance with the method described in the first operation example. It should be noted that the article recognition processing is not limited to a particular method.

When the processor 21 completes the article recognition for each article extracted from the captured image, in ACT 49, the processor 21 determines the outer shape including a height (e.g., height a in FIG. 9) of each article. For example, in respect to the recognized article, the processor reads, for example, the height of the article (height a in FIG. 9) registered in the article dictionary 24a and the outer shape information of the article and determines the outer shape including the height of the article.

In ACT 50, in respect to the recognized article, the processor 21 determines whether or not the tilt is equal to or larger than a predetermined threshold. The threshold used for determination in ACT 50 is a threshold for checking whether or not the article on the placement surface of the placement table 3 tilts due to the leaning placement. The threshold used for the determination in ACT 50 may be the same value as the threshold used for the determination in ACT 46 or may be a different value.

In a case where the processor 21 determines that the tilt of the article is equal to or larger than the threshold, i.e., in a case where the processor 21 determines that the article is in the leaning placement state (YES ACT 50), the processing of the processor 21 proceeds to ACT 51. In ACT 51, the processor 21 calculates a height depending on the tilt of the article (height of the article in the leaning placement state). For example, the processor 21 calculates a height of the article on the basis of the outer shape information of the article determined in accordance with the article dictionary 24a and the height of the article determined in ACT 45.

Figure 9:
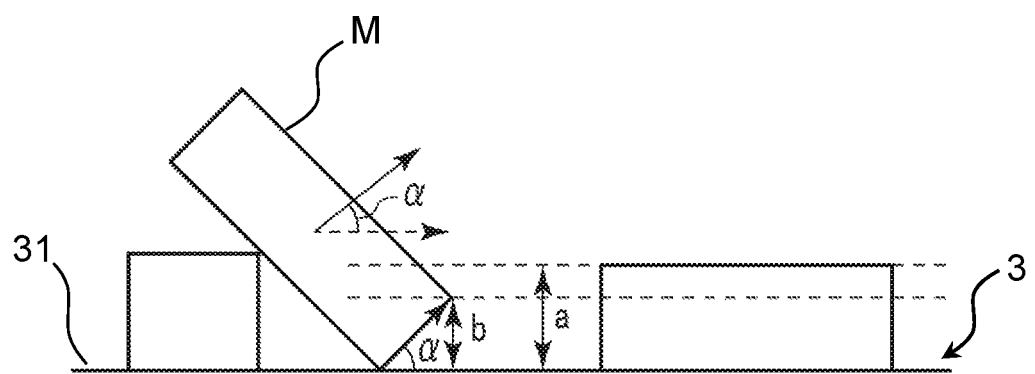
FIG. 9 is a diagram for describing a height depending on the tilt of the article in the article recognition apparatus according to the embodiment.

FIG. 9 shows a relationship between the height a of the article registered in the article dictionary 24a and the height of the article in the leaning placement state. In the example shown in FIG. 9, the height a from the placement surface shown as the dotted line indicates the height of the article registered in the article dictionary 24a. Further, a height b from the placement surface 31 shown as the long dashed short dashed line indicates the height of the article in the leaning placement state. For example, the height b indicates a distance from the placement surface 31 to a lowest position in the upper surface of the article in the leaning placement state. The height b is determined on the basis of information (depth information) regarding a distance measured by the distance sensor 5. The height b is obtained as a measurement value actually measured by the distance sensor 5 in respect to the article placed on the placement table 3.

Here, it is assumed that the information indicating the outer shape information of the article (including the height a) has been registered in the article dictionary 24a. Assuming that the article M is placed on the placement surface 31 on the placement table 3 as shown in FIG. 9, the height b of the article M depending on a tilt α of the article M can be calculated (estimated) on the basis of the outer shape of the article M registered in the article dictionary 24a. For example, in a case where the outer shape of the article M is a rectangular parallelepiped shape, the processor 21 is capable of calculating the height b on the basis of the outer shape information (height a) of the article M registered in the article dictionary 24a and the tilt α of the article M by using a trigonometric function. If the height of the article calculated on the basis of the information registered in the article dictionary 24a and the tilt of the article is identical to the height measured by the distance sensor 5, it can be determined that the article is not placed overlapping the other article.

In a case where the processor 21 determines that the tilt of the article is equal to or larger than the threshold (YES ACT 50), the processing of the processor 21 proceeds to ACT 51. In ACT 51, the processor 21 calculates the height depending on the tilt of the article on the basis of the information registered in the article dictionary 24a. In ACT 52, the processor 21 performs overlap determination on the article in the leaning placement state by comparing the height of the article calculated on the basis of the registered information and the tilt with the height measured by the distance sensor 5.

Further, in a case where the processor 21 determines that the tilt of the article is not equal to or larger than the threshold (NO ACT 50), the processing of the processor 21 proceeds to ACT 52. In ACT 52, the processor 21 performs the overlap determination on the article on the basis of the outer shape (the height a) of the article registered in the article dictionary 24a and the height measured by the distance sensor 5.

Here, the overlap determination refers to determination as to whether or not the article is placed overlapping the other article. In this embodiment, in a case where an article placed on the placement table 3 is placed leaning against another article, article recognition processing for that article is enabled. However, in a case where an article placed on another article is placed leaning against still another article (in an overlapping placement state), article recognition processing for that article is disabled.

In ACT 53, the processor 21 performs the overlap determination. In a case where the processor 21 determines that the article overlaps another article as a result of overlap determination (YES ACT 53), the processing of the processor 21 proceeds to ACT 54. In ACT 54, the processor 21 emits an alert (ACT 54), and the processing of the processor 21 returns to ACT 41 thereafter. For example, the processor 21 displays on the display 6 the fact that the article is placed on the placement table 3 in an overlapping manner, as the alert. Alternatively, the processor 21 may display on the display 6 a guidance for prompting to retry, saying "Please rearrange the article placed in the overlapping manner and carry out the article recognition again" as the alert.

Further, in a case where the processor 21 determines that the article does not overlap another article as a result of overlap determination (NO in ACT 53), the processor 21 terminates the article recognition processing shown in FIG. 8. In this case, the processor 21 outputs the result obtained in the article recognition processing in ACT 48 as a recognition result of the article placed on the placement table 3. For example, the processor 21 may display information indicating the recognized article on the display 6.

As described above, in the third operation example, the article recognition apparatus 1 determines the tilt of the article on the basis of the captured image and detects whether or not the leaning placement of the article has occurred on the basis of the tilt of each article. In a case where the article recognition apparatus 1 detects the leaning placement of the article, the article recognition apparatus 1 corrects the image information of the article in a manner that depends on the tilt of the article and performs the article recognition processing. In addition, the article recognition apparatus 1 also performs the overlap determination on the article determined as the article in the leaning placement state. In a case where the article recognition apparatus 1 detects that the article is placed overlapping the other article, the article recognition apparatus 1 emits the alert and prompts to retry the article recognition processing.

Accordingly, in accordance with the third operation example, it is possible to perform the article recognition even on the article in the leaning placement state and in addition, it is possible to perform determination as to the overlapping placement even on the article in the leaning placement state. As a result, the article recognition apparatus 1 according to the third operation example is capable of reliably performing article recognition processing on the article in the leaning placement state and error handling on the article in the overlapping placement state.

It should be noted that the article recognition apparatus 1 according to the third operation example can also be used in the payment system. In the payment system to which the article recognition apparatus 1 according to the third operation example is applied, the article in the leaning placement state can be subjected to recognition and payment and the article in the overlapping placement state which disables the article recognition can be subjected to error handling.

It should be noted that in the above-mentioned embodiments, the program to be executed by the processor is pre-stored in the internal memory of the apparatus. However, the program to be executed by the processor may be downloaded into the apparatus from a network or may be installed into the apparatus from a storage medium. Any storage medium can be employed as it is a storage medium such as a CD-ROM that is capable of storing the program and readable by the apparatus. Further, the function of obtaining the program by install or download in advance may be achieved by cooperation with an operating system (OS) and the like inside the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article recognition apparatus, comprising:
   a first interface that obtains an image obtained by imaging a placement region of an article;
   a second interface that obtains information regarding a distance from a predetermined position to the article present in the placement region of the article; and
   a processor that
      determines an article region from the image obtained by the first interface,
      determines a tilt of the article present in the determined article region on a basis of the distance obtained by the second interface, and
      determines on a basis of the determined tilt of the article that the article is placed in the placement region in a state in which the article leans against another object.

2. The article recognition apparatus according to claim 1, wherein
   the processor
      determines the article region from the obtained image by using the obtained information regarding the distance,
      determines a normal line of a surface of the imaged article on a basis of the obtained information regarding the distance, and
      determines the tilt of the article on a basis of the determined normal line.

3. The article recognition apparatus according to claim 1, wherein
   the processor
      determines whether or not the determined tilt of the article is equal to or larger than a predetermined threshold, and
      determines on a basis of a result of the determination that the article is placed in the placement region in a state in which a part of the article leans against the other object.

4. The article recognition apparatus according to claim 1, further comprising
   a memory that stores article information regarding an article set as a recognition target, wherein
   the processor
      extracts image information for recognizing the article from an image of the article region, and
      recognizes the article on a basis of the image information and the article information stored in the memory.

5. The article recognition apparatus according to claim 4, wherein
   the processor
      corrects, in a case where the processor determines that the article is placed in the state in which the article leans against the other object, the image information obtained from the image of the article region in a manner that depends on the tilt of the article, and
      recognizes the article on a basis of the corrected image information and the article information stored in the memory.

6. The article recognition apparatus according to claim 4, wherein
   the processor
      corrects, in a case where the processor determines that the article is placed in the state in which the article leans against the other object, the article information stored in the memory in a manner that depends on the tilt of the article, and
      recognizes the article on a basis of the image information obtained from the image of the article region and the corrected article information.

7. The article recognition apparatus according to claim 1, further comprising
   an informing apparatus that outputs an alert, wherein
   the processor causes the informing apparatus to output an alert in a case where the processor determines that the article is placed in the state in which the article leans against the other object.

8. The article recognition apparatus according to claim 1, wherein
   the processor
      calculates a height of the article that depends on the tilt of the article, and
      determines whether or not the article is placed overlapping the other article on a basis of the calculated height of the article that depends on the tilt of the article and the distance obtained by the second interface.

9. The article recognition apparatus according to claim 8, further comprising
   a memory that stores outer shape information of the article set as the recognition target, wherein the processor calculates the height of the article that depends on the tilt of the article on a basis of outer shape information of the article and the determined tilt of the article, the outer shape information being stored in the memory.

10. The article recognition apparatus according to claim 9, wherein the processor determines the height of the article that depends on the tilt of the article on a basis of the information regarding the distance that is obtained by the second interface, and determines whether or not the article is placed overlapping the other article on a basis of the calculated height of the article that depends on the tilt of the article and the determined height of the article that depends on the tilt of the article.

* * * * *